US009927087B1

(12) United States Patent
Greene et al.

(10) Patent No.: US 9,927,087 B1
(45) Date of Patent: Mar. 27, 2018

(54) FIBER OPTIC LIGHT PANEL HAVING A LIGHT ENHANCING ELEMENT

(71) Applicant: Valeo North America, Inc., Troy, MI (US)

(72) Inventors: Kayla Greene, Seymour, IN (US); John Orisich, Seymour, IN (US); Brant Potter, Seymour, IN (US); Mark Madden, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/372,087

(22) Filed: Dec. 7, 2016

(51) Int. Cl.

| | |
|---|---|
| ***F21V 9/00*** | (2015.01) |
| ***F21S 8/10*** | (2006.01) |
| ***B60Q 1/30*** | (2006.01) |
| *F21Y 115/15* | (2016.01) |

(52) U.S. Cl.
CPC ............ *F21S 48/2225* (2013.01); *B60Q 1/30* (2013.01); *F21S 48/13* (2013.01); *F21S 48/217* (2013.01); *F21S 48/2218* (2013.01); *F21Y 2115/15* (2016.08)

(58) Field of Classification Search
USPC .......................................... 362/511, 509, 282
See application file for complete search history.

(56) References Cited

U.S. PATENT DOCUMENTS

2004/0196667 A1* 10/2004 Lea ...................... G02B 6/0046 362/583
2012/0212659 A1* 8/2012 Jolma ...................... A61B 3/14 348/335
2016/0018598 A1* 1/2016 Hansson ................ F21S 11/007 385/33
2016/0245471 A1* 8/2016 Nakazato ............. F21S 48/1195

FOREIGN PATENT DOCUMENTS

AU 442599 9/2009
EP 0 359 450 A2 3/1990
WO 2006/110401 A2 10/2006

* cited by examiner

*Primary Examiner* — Vip Patel
(74) *Attorney, Agent, or Firm* — Oblon, McClelland, Maier & Neustadt, L.L.P.

(57) ABSTRACT

A lighting module for a vehicle includes a light source, and a light emitting panel optically coupled to the light source and has an array of optical fibers. A light enhancing element is optically coupled to the light emitting panel such that the panel outputs light with a first cone angle to the light enhancing element. The light enhancing element is configured to narrow the first cone angle to a second cone angle smaller than the first cone angle.

20 Claims, 11 Drawing Sheets

FIBER OPTIC LIGHT PANEL HAVING A LIGHT ENHANCING ELEMENT

FIELD OF THE INVENTION

This invention relates to lighting systems, and more particularly to a lighting and/or signaling device that utilizes fiber optic light panels and light intensity enhancing elements.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, as of the date of this filing Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Aesthetic lighting effects lead to an even greater number of components and complexity. Such vehicle lighting devices are not easily adapted to the styling of the vehicle.

In recent years some vehicle manufacturers are utilizing organic light-emitting diodes (OLED) in an effort to meet desired lighting and aesthetic characteristics of vehicle lighting. OLED devices generally take the form of very thin panels that can be formed into three-dimensional shapes. Fiber panel LEDs may have a similar panel form to OLEDs. For example, U.S. Pat. No. 6,874,925 discloses fiber optic light emitting panel assemblies. However, these assemblies have generally been limited to LCD backlighting, surgical devices, phototherapy and other applications not subject to the technical requirements of vehicle lighting.

SUMMARY OF THE INVENTION

It is one object of the invention to provide a fiber optic light panel device that can meet the technical and aesthetic requirements for vehicle lighting.

Another object of the invention is to provide a fiber optic light panel device that can conform to the styling of a vehicle.

Yet another object of the invention is to provide fiber optic vehicle light panel having a modified output cone angle adapted to a light element test point region.

These and/or other objects may be provided by embodiments of the invention disclosed herein.

In one embodiment a lighting device for a vehicle includes a light source for generating light, and a lighting panel having a light emitting side and a light reflecting side opposing the light emitting side. The lighting panel includes an optical fiber layer having a plurality of optical fibers each configured to emit the light along a length of the optical fiber. The plurality of optical fibers are arranged in a predetermined form such that the optical fiber layer has a first side facing the light emitting side of the lighting panel and a second side facing the light reflecting side of the lighting panel. A reflecting layer is provided on the second side of the optical fiber layer and is configured to reflect the light toward the first side of the optical fiber layer. At least one layer of the lighting panel is an aesthetic layer selected for aesthetic appeal and being visible from the light emitting side of the lighting panel in an unlit state. A bundling element is configured to hold ends of the plurality optical fibers in a bundle which is optically coupled to the light source.

In one aspect, the light source includes a solid state light source. The plurality of optical fibers of the lighting device may be arranged in an array, or arranged in a woven configuration.

The at least one aesthetic layer of the lighting device can include the reflecting layer, and/or a highly reflective colored film. The highly reflective colored film may be a color which matches a color of the light generated by the light source.

The reflecting layer of the lighting device may include a metal which provides a metallic appearance of the light emitting side of the lighting panel in an unlit state. Alternatively, the reflecting layer includes a diffusive reflecting material partially coated with said metal. A partially coated amount of the metal provides the metallic appearance of the light emitting side of the lighting panel in the unlit state and leaves a portion of the diffuse reflecting material exposed. The metal may include at least one of aluminum, silver and gold.

The at least one aesthetic layer of the lighting device may include a structural layer configured to fix the lighting panel. The structural layer may include a bezel configured to fix the lighting panel in a predetermined shape.

The at least one aesthetic layer may include the fiber optic layer, and the plurality of optical fibers may be colored in an unlit state of the lighting panel. The fiber optic layer may include the plurality of optical fibers encapsulated in a colored medium having a predetermined color in an unlit state of the lighting panel.

The at least one layer of the lighting device may include a transmission layer provided on the light emitting side of the panel, and the transmission layer may be colored in an unlit state. The transmission layer may include a one way mirrored coating which transmits the light when the panel is in a lighted state, and which appears mirrored in an unlit state.

Another aspect of the invention includes a method of manufacturing a lighting device for a vehicle. The method includes providing a plurality of light sources each configured to generate light, providing a light panel including a plurality of optical fibers arranged in a predetermined form, and bundling ends of the optical fibers of the light panel together to form an input to the light panel. At least one aesthetic layer is provides visible from a light emitting side of the panel in an unlit state, and is selected to provide aesthetic appeal of the lighting device in an unlit state. One of said plurality of light sources is selected to provide a light output to compensate for optical properties of the aesthetic layer, and the selected light source is coupled to the light panel.

DETAILED DESCRIPTION OF SEVERAL EMBODIMENTS

Fiber optic light panels have previously been used in backlighting liquid crystal displays and electronic controls. U.S. patent application serial no. PCT/US2015/036629 (unpublished) titled Fiber Optic Lighting And/or Signaling System for a Vehicle, filed on Jun. 19, 2015 by the same Applicant as the present application, discloses a fiber optic light panel device for exterior lighting of vehicles. The entire contents of this application are incorporated herein by reference.

A fiber optic light panel assembly generally includes a light source that inputs light to a fiber bundle having fibers extending therefrom to form a light panel. A reflective backing may be provided on one side of the panel to reflect emitted light to a light output side of the panel. For example, U.S. Pat. Nos. 6,874,925 and 5,307,245 disclose such existing light panel assemblies. These light panel assemblies are generally designed to provide a diffuse output from a plane of the panel, which provides a homogeneous glow effect that is aesthetically appealing for automotive lighting applications. The inventors have recognized, however, that the characteristic output of these existing panels may not meet the photometric requirements for automotive lighting. Embodiments of the present invention provide a fiber optic light panel having a light enhancing element for meeting automotive lighting application requirements.

Figure 1:
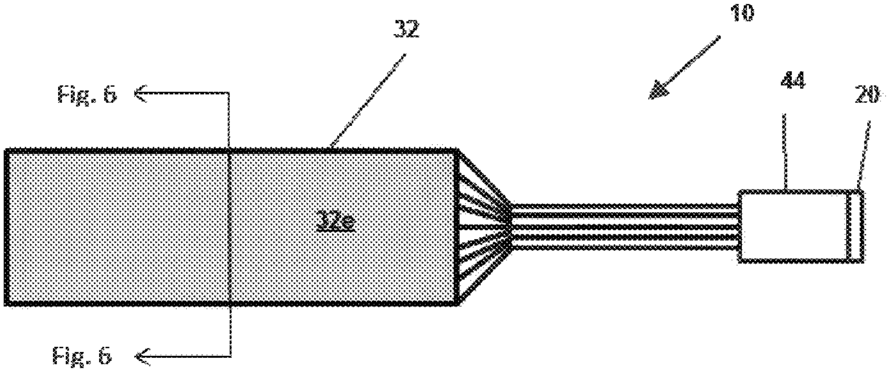
FIG. 1 is a schematic view of a fiber optic light panel device in accordance with embodiments of the invention.

FIG. 1 is a schematic representation of a lighting system in accordance with an embodiment of the invention. The lighting system 10 includes a light source 20, a fiber bundle 44, and a fiber panel 32. The light source 20 generates light for coupling to the fiber panel 32, which emits light from a surface thereof to meet the desired lighting function. A light emitting side of the panel 32 is indicated by 32*e* in FIG. 1. According to embodiments of the invention, at least one element of the panel 32 is selected to enhance light output of the panel for a specific lighting function. For example, a light enhancing element may be provided to reduce a cone angle of the emitted light to increase brightness in a particular region for providing a vehicle lighting function. The fiber bundle 44 groups fibers of the panel 32 in a configuration suitable for accepting light into the fiber panel 32.

The light source 20 may be any suitable source for generating light having photometric characteristics to provide a desired light output from panel 32. For example, the light source 20 may provide a lambertion pattern or any other radiation pattern of suitable flux, wavelength and intensity to satisfy the lighting function or aesthetic lighting effects of the panel 32. An element in the panel 32 providing for light enhancement according to the invention may alter or detract from light output characteristics of a panel 32 relative to conventional panels. According to embodiments of the invention, other optical properties of the device are modified to compensate for this reduction so that a vehicle lighting device, for example, can meet technical specifications and also provide the desired glow effect. For example, a panel having a light enhancing element may reduce the total light flux output at the panel 32, and a higher power light source is provided to compensate for this loss of efficiency.

The light source 20 may include one or more light emitting devices or solid state light sources. The term "solid state" generally refers to light emitted by solid-state electroluminescence, as opposed to incandescent bulbs or fluorescent tubes. For example, the light source 20 may include a semiconductor light emitting diode (LED) or laser diode, an OLED, polymer light emitting diode (PLED), an LED lamp package, LED chip or LED die, or an array of one or more of these devices. Where a plurality of LEDs is used, they can be the same or different colors. It should be understood that the light source 20 could be multiple discrete LEDs or an LED light bar. A conventional printed circuit board (PCB) having one or more LEDs could be used with the optical fiber panel 32. In one example, the light source may be an LED providing a 2 W, 140 lm output at 2.65 v and 750 mA of current. Alternatively, a 860 mA, 6.29V, 510 lm white 1×2 LED source may be provided as light source 20. Halogen bulbs and/or an HID source may also be used.

Figure 2:
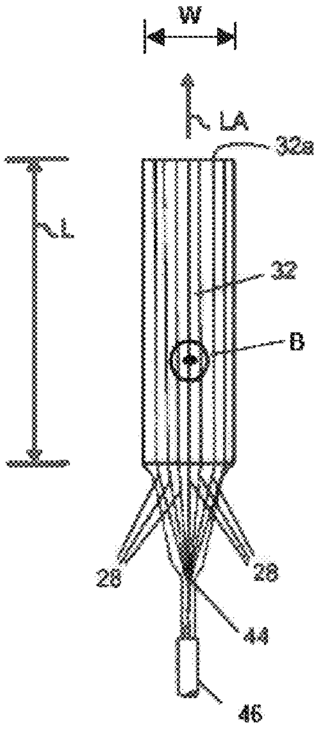
FIG. 2 is a planar view of a fiber optic light panel used in a lighting device according to embodiments of the invention.

FIG. 2 is a view of a fiber optic light panel used in a lighting system according to embodiments of the invention. The fiber optic light panel 32 includes a plurality of optical fibers 28 that extend along a length L of the panel 32, terminating at an end 32*a* of the panel. The fibers 28 are arranged in an array along a width W such that they define a generally planar and generally rectangular panel 32. The panel 32 may assume other arrangements and forms and is not limited to rectangularity and/or straight lines. For example, the panel 32 may have a width W that generally exceeds a length L. In example embodiments, the panel 32 is pliable and flexible, and may be adapted to be received in a support or frame which may define a three dimensional form of the light panel 32.

In the embodiment of FIG. 2, the plurality of optical fibers 28 are arranged in a generally parallel relationship with respect to each other and with respect to a longitudinal axis LA of the panel 32. However, it should be understood that the plurality of optical fibers 28 may assume similar or different positions (e.g., parallel, non-parallel, curved, arcuate or serpentine). For example, some of the plurality of optical fibers 28 may be straight while others are not. Further, although the plurality of optical fibers 28 are shown extending along the entire length L of the panel 32, respectively, some or all of the plurality of optical fibers 28 could extend less than the entire length. The plurality of optical fibers 28 could be longer than the length L and arranged, for example, in a circular, elliptical, polygonal or other pattern within the panel 32.

It should be understood that the panel 32 may include any number of fibers 28 depending on the environment in which they are going to be used. In some of the embodiments, there are approximately fifty (50) fibers of 0.23 mm diameter per panel 32, or 100 fibers per inch width W (per layer). Obviously, these are just illustrations and other numbers and sizes of fibers 28 could be used. Also, the plurality of optical fibers 28 may have different sizes or dimensions, such as different diameters. Thus, the plurality of optical fibers 28 can be different shapes, dimensions and sizes and are adapted and arranged in the predetermined form depending on the light pattern or lighting function desired.

A conventional optical fiber generally transmits light through total internal reflection (TIR) from an input end to an output end of the fiber. According to embodiments of the invention, the fibers 28 of the optical light panel system 10 are configured and/or arranged such that light is emitted along a length of the fibers 28 making the panel 32 illuminate in a direction that is generally not parallel with a longitudinal axis LA of the fiber, as shown by point B in FIG. 2, which represents light rays coming out of the plane of the page.

Figure 3:
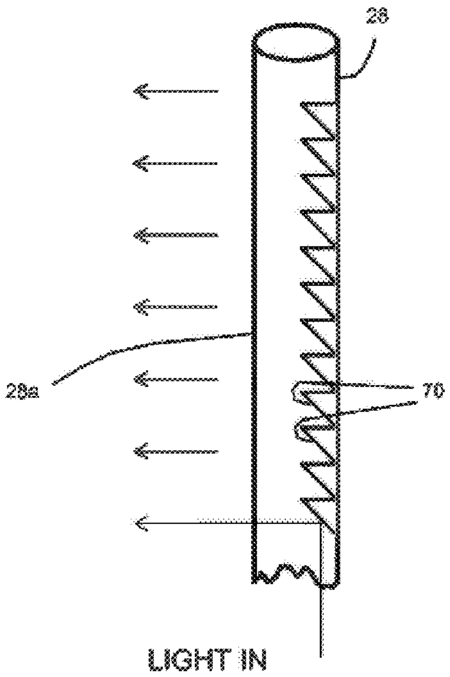
FIG. 3 is a schematic view of an optical fiber adapted to emit light along a length of the optical fiber.

FIG. 3 is a schematic view of an optical fiber adapted to emit light along a length of the optical fiber. To facilitate the light being emitted generally transverse to a longitudinal axis of the fiber 28, the fiber 28 may be modified to include optics such as a plurality of facets or reflective surfaces 70 which direct or reflect the light through a surface 28*a* of the fiber 28. Altering the fibers 28 to direct light in the desired direction can be achieved through a variety of methods including, but not limited to: providing the plurality of facets or reflective surfaces 70 as mentioned, laser ablating a surface of the fiber 28, mechanical abrasion of a surface of each fiber 28, etc. Further, depth, density and type of the alterations may be varied along the length of the fiber to achieve different light output effects along the fiber. For example, spacing between reflective surfaces 70 may be varied in different portions of the fiber to achieve more or less light intensity at the surface 28*a* of the fiber.

Figure 4:
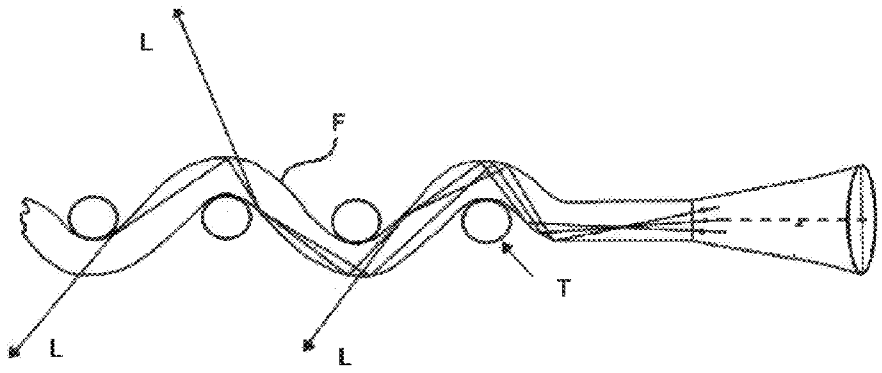
FIG. 4 is a schematic view of another optical fiber adapted to emit light along a length of the optical fiber.

FIG. 4 is a schematic view of another optical fiber adapted to emit light along a length of the optical fiber. It has been found that wrapping or curving the fiber may also cause light to exit a side surface of the fiber F as shown in FIG. 4. Thus, causing at least one or a plurality of the optical fibers 28 to be curved along their longitudinal axis can enable the fibers to emit light or illuminate into a predetermined or desired direction, such as the direction indicated by point B in FIG. 2. It is desirable to capitalize on this feature by providing a woven pattern of the plurality of optical fibers 28 with fill thread T in order to generate a predetermined lighting function or result. A variety of weave patterns may be selected to produce a desired lighting function, effect or characteristic. In some embodiments, a light panel may include fibers which are altered as discussed in FIG. 3, and also woven. Combinations of fiber alteration and weave may be used to achieve spatial effects for light output from the panel 32.

Figure 5A:
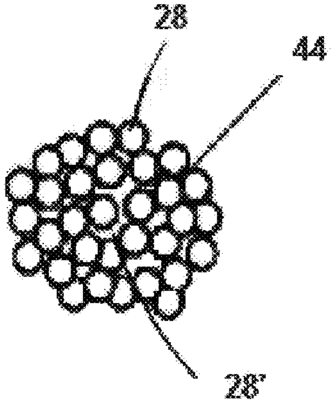
FIGS. 5A and 5B show alternative embodiments of a fiber bundle used in a lighting device in accordance with embodiments of the invention.
Figure 5B:
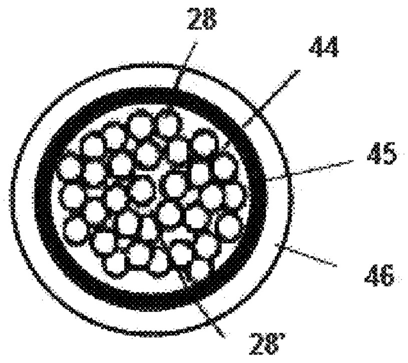

Returning again to FIG. 2, the plurality of optical fibers 28 extend out of the panel 32 and are gathered and combined in a bundle 44 which functions as a light-receiving end or input end of the panel 32. The fiber bundle 44 may include any bundling element or substance suitable to maintain the fibers 28 in a predetermined cross sectional shape. FIGS. 5A and 5B show alternative embodiments of a fiber bundle 44 and bundling elements used in a lighting system in accordance with embodiments of the invention. As seen in FIG. 5A, the fiber bundle 44 may be maintained by adhesive 28' provided between the fibers 28 as the bundling element to bond the fibers together. Alternatively, the fiber bundle 44 may be maintained by a coupling, 46 (such as a ferrule) as shown in FIG. 5B. The bundle 44 may also include a wrap, sleeve, adhesive, tape, resin or the like to facilitate holding the fibers 28 in the bundled position as illustrated by 45 in FIG. 5B.

Figure 6:
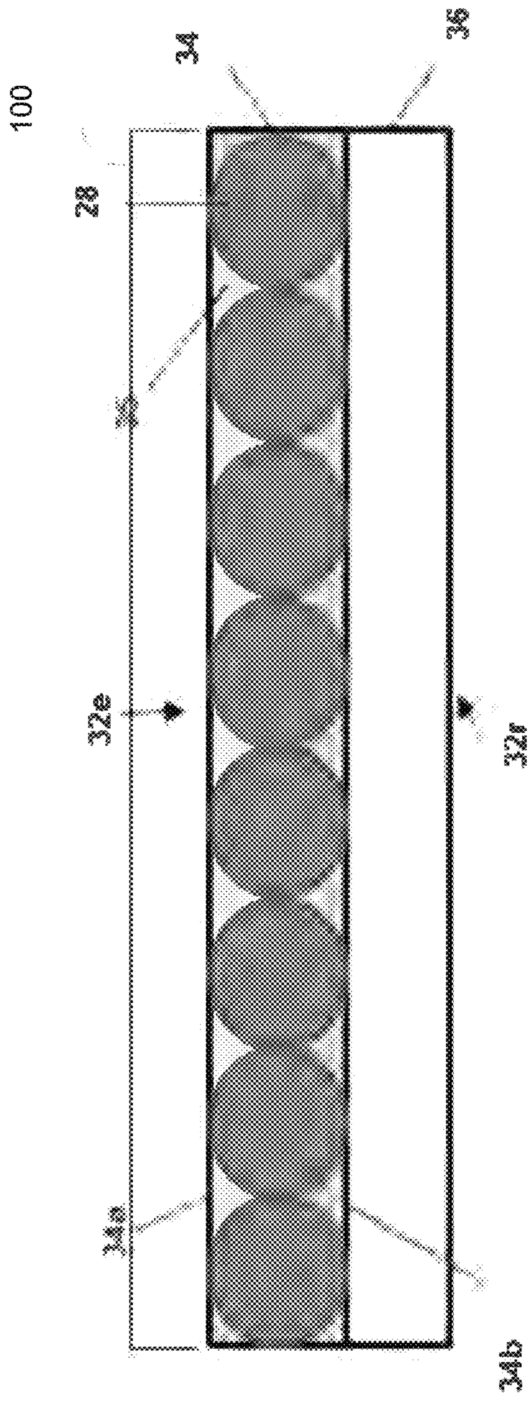
FIG. 6 is a cross-sectional view of an optical fiber panel in accordance with embodiments of the invention.

FIG. 6 is a schematic view of a cross-section of the lighting panel 32 in FIG. 1. As seen, the panel 32 is a layered structure including an optical fiber layer 34, a reflecting layer 36, and a light enhancing element 100. As seen, the panel 32 has a light emitting side 32*e* and a light reflecting side 32*r*. The optical fiber layer 34 includes a plurality of optical fibers 28 each configured to emit light along a length of the optical fiber as discussed above. The plurality of optical fibers 28 are arranged in a predetermined form such that the optical fiber layer 34 has a first side 34*a* facing the light emitting side 32*e* of the lighting panel and a second side 34*b* opposing the first side and facing the light reflecting side 32*r* of the lighting panel 32.

A reflecting layer 36 is provided on the second side 34*b* of the optical fiber layer 34. While shown in direct contact, one or more layers having optical properties may be interposed between the fiber layer 34 and reflecting layer 36. The reflecting layer 34 is configured to reflect light emitted along a length of the optical fibers toward the first side 34*a* of the optical fiber layer 32. According to embodiments of the invention, a light intensity enhancing element 100 is provided to modify the panel output for vehicle lighting functions. At least one layer of the lighting panel 32 may be an aesthetic layer selected for aesthetic appeal in an unlit state, and is visible from the light emitting side 32*e* of the lighting panel in an unlit state. Example aesthetic layers provide a desired unlit appearance in accordance with color, texture, shape, gloss or other desired characteristics are disclosed in U.S. patent application Ser. No. 15/217,703 filed on Jul. 22, 2016, the entire contents of which is incorporated herein by reference.

In the embodiment of FIG. 6, the light enhancing element 100 is provided on a light output side 32*e* of the panel 32 and shown as a discrete layer. However, the light enhancing element 100 may be an integral part of the fiber layer 34 and or the reflection layer.

Figure 7A:
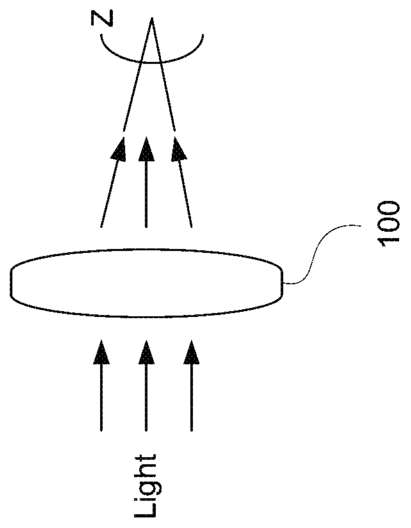
FIG. 7A represents a side view of a light intensity enhancing element that effectively functions as a convex lens, according to one example.
Figure 7B:
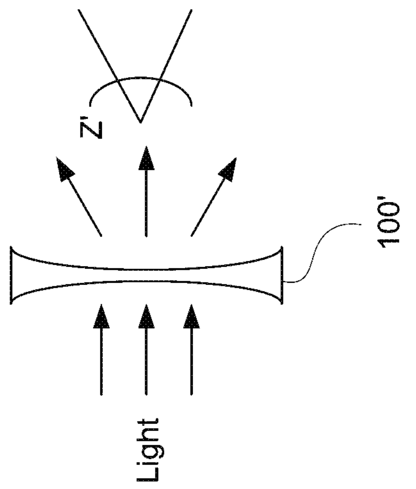
FIG. 7B represents a side view of a light intensity enhancing element that effectively functions as a concave lens, according to one example.

FIGS. 7A and 7B are functional illustrations of light intensity enhancing elements in accordance with embodiments of the invention. FIG. 7A represents a side view of a light intensity enhancing element 100 that effectively functions as a convex lens, according to one example. The light intensity enhancing element 100 may be a transparent or translucent body, material or combination of materials, and refract light in relation to a light source 20. The light intensity enhancing element 100 may change a transmission direction of light waves as the light waves pass through the light intensity enhancing element 100, changing refraction of the lighting system 10 and concentrating or diffusing light that is emitted. Factors affecting refraction may include material density and geometry of the light intensity enhancing element 100. The light intensity enhancing element 100 that is effectively convex relative to the light source 20 may concentrate light emitted over a cone angle Z. In one example, the light source 20 of the lighting system 10 is an OLED and the light intensity enhancing element 100 may be a film, a membrane, or may be etched, molded, printed, or otherwise optically connected to the panel 32.

In another example, the light intensity enhancing element 100 may comprise the panel 32 formed as one part from glass, polycarbonate, another compound of plastic, or some combination thereof. Further, the shape of the panel 32 with respect to the direction of light emission may be substantially flat, concave, or convex and vary over different areas of the panel 32, such as that illustrated by FIG. 14A discussed below.

In another example, the light intensity enhancing element 100 may comprise a combination of at least two separate elements 100*a*, 100*b*, 100*c*, and 100*d*, and the panel 32 formed from glass, polycarbonate, another compound of plastic, or some combination thereof to optically connect.

FIG. 7B represents a side view of a light intensity enhancing element 100' that effectively functions as a concave lens, according to one example. As in FIG. 7A, the factors affecting refraction remain largely the same to concentrate or diffuse light transmission. However, the light intensity enhancing element 100' that is effectively concave relative to the light source 20 may diffuse light emitted, decreasing luminosity of light output and projecting it over a wider cone angle Z' compared to the cone angle Z of FIG. 7A.

In either case of FIG. 7A or 7B, as light waves travel through a light intensity enhancing element 100 some amount of efficiency may be lost due to a refractive index of each light intensity enhancing element 100. The more light intensity enhancing elements that 100 light waves must pass through, the more efficiency may be lost in terms of total luminosity (e.g. candela). However, for some applications the loss is acceptable in order to achieve a sufficient magnitude, concentration, or desired intensity profile over a specific range or area.

As noted above, fiber optic light panels provide a desirable glow effect and are less expensive and more reliable than OLED lighting; but fiber panels may not meet light output requirements for vehicle exterior lighting. For example, traditional LED lighting systems use a point source LED component generally having a greater light output than a fiber optic panel driven by the same light source. Moreover, traditional LED systems may use a lens or lens system to enhance the light output where needed, but such lenses are not practical for planar light sources such as the fiber optic panel. The inventors have recognized that an output of 2-4 candelas in the H-V region of a common test field is challenging to achieve with fiber light panels, and thus is not enough to meet vehicle lighting requirements.

Figure 8:
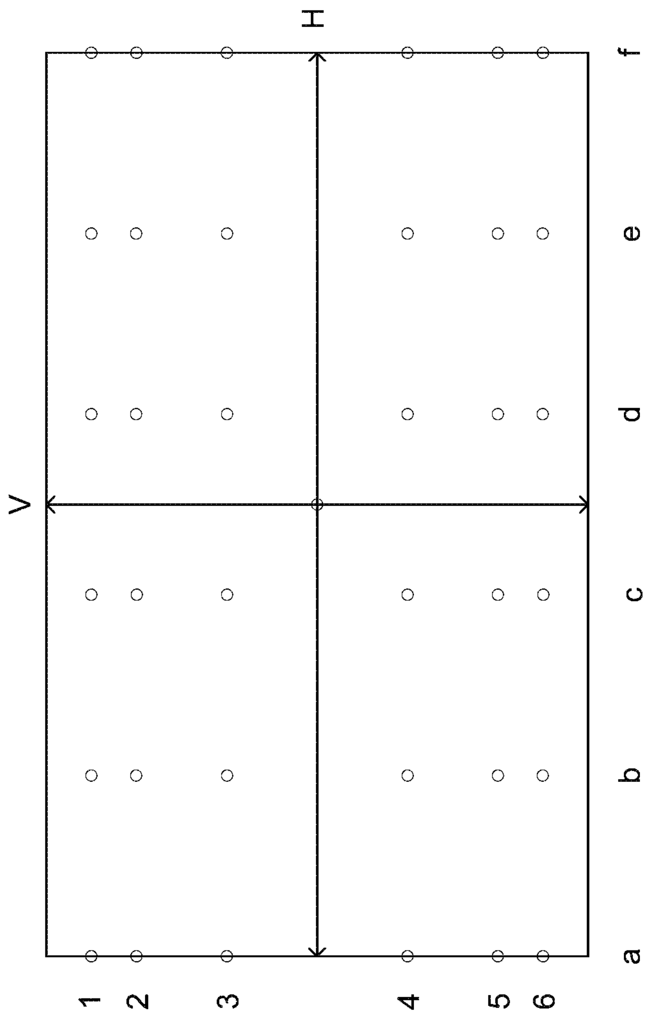
FIG. 8 represents an H-V axis of a light testing field, commonly used in the automotive industry to determine compliance with regulations, according to one example.

FIG. 8 represents an H-V axis of a light testing field, commonly used in the automotive industry to determine compliance with regulations, according to one example. Light emitted by the light source 20 may be projected through a first surface of the fiber panel 32, forming a first cone angle that is projected out of a second surface of the fiber panel 32, and onto the H-V axis in free space. Embodiments of the light enhancing element 100 are provided in the lighting system 10. The light enhancing element 100 is provided to meet luminosity and intensity requirements. For example, light output of the lighting system 10 may be required to be directed over a specific angle or range, and to exceed a specific luminance at certain locations within the specific angle or range for a particular vehicle lighting function. Locations are represented on a coordinate system, for example, such as by points a1, c4, and e3.

Figure 9B:
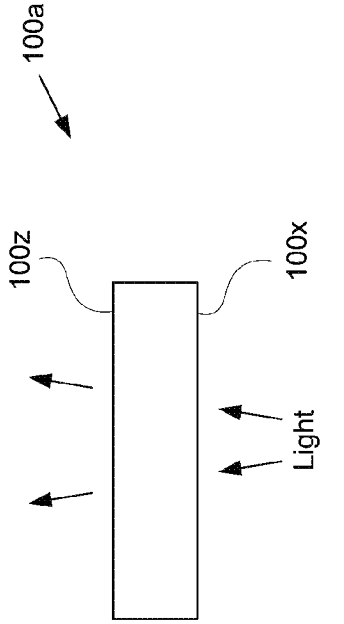
FIG. 9A-9C represent various views of a light intensity enhancing element, according to one example.
Figure 9A:
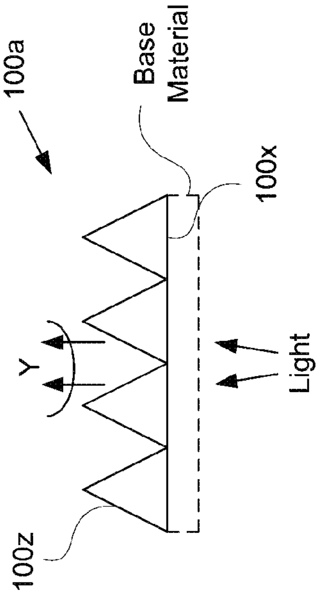
Figure 9C:
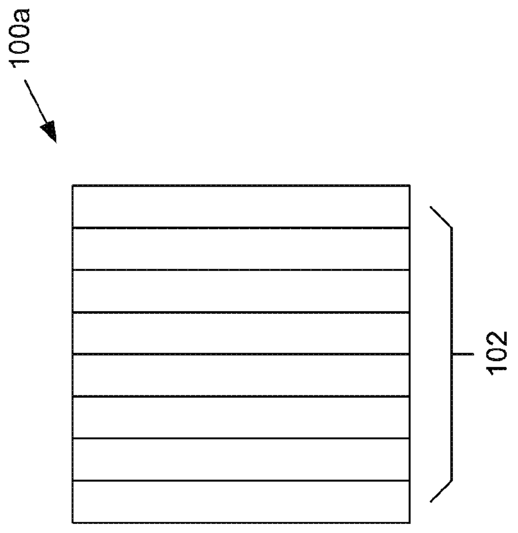

FIG. 9A is a front view of the light intensity enhancing element 100*a*, FIG. 9B is a side view, and FIG. 9C is a plan view, according to one example. The light intensity enhancing element 100*a* includes a first set of ridges 102 oriented in one direction and substantially parallel, with an evenly spaced pitch between ridges 102. A base material may be used to provide structural support for the light enhancing element 100*a* as shown by the phantom structure in FIG. 9A. The light enhancing element 100*a* may be printed, etched, or mold formed into the base material for example.

Light emitted from a first side 100*x* of the light intensity enhancing element 100*a* through to a second side 100*z* is channeled through the light intensity enhancing element 100*a* between the first set of ridges 102, the ridges narrowing a path of light emitted to within a cone angle Y in a direction along planes approximately perpendicular to the first side 100*x*, the planes approximately parallel with the length of the first set of ridges 102. However, the path of light may not be parallel in another plane, such as illustrated by FIG. 9B. According to embodiments of the invention, the arrangement, pitch, and/or geometry of the ridges are configured to enhance light output from the element 100*a* to achieve photometric characteristics for vehicle lighting. As would be understood by one of ordinary skill in the art, other aspects of the light enhancing element 100*a*, such as material composition may also be selected for this purpose. In one example, the pitch of the ridges 102 may be decreased to narrow a cone angle of the light passing through the element, or increased to widen the cone angle, assuming other factors are unchanged. Further, a height or depth of the ridges can be increased or decreased to provide the desired optical effect. Still further, the ridges 102 may be graded across a surface of the element 100*a* to provide spatial variation of light output characteristics.

Figure 10B:
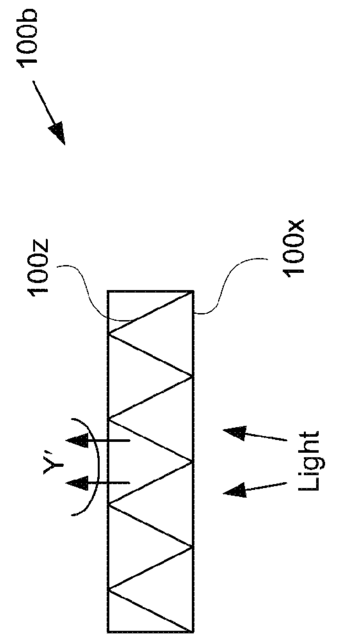
FIG. 10A-10C represent various views of a light intensity enhancing element, according to one example.
Figure 10A:
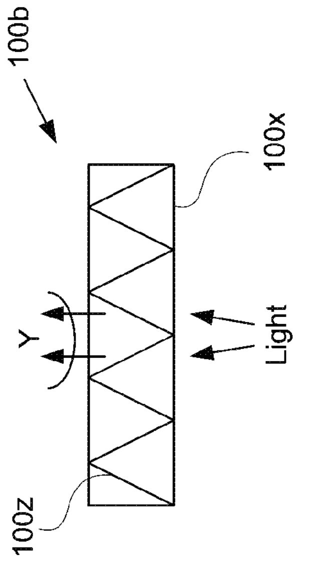
Figure 10C:
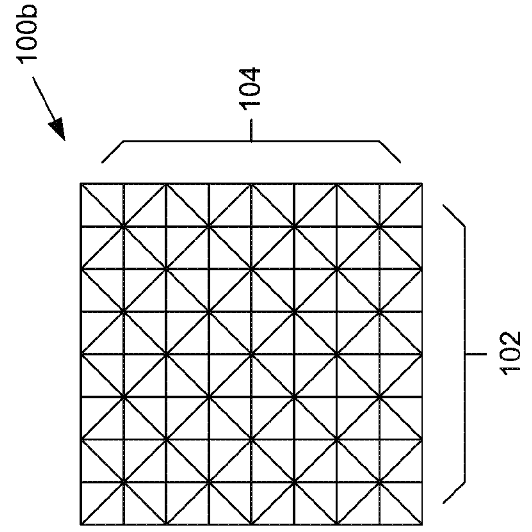

FIG. 10A is a front view of the light intensity enhancing element 100*b*, FIG. 10B is a side view, and FIG. 10C is a plan view, according to one example. The light intensity enhancing element 100*b* includes a first set of ridges 102 oriented in a first direction, the ridges approximately parallel, and a second set of ridges 104 approximately orthogonal to the first set of ridges 102. This arrangement may be used to narrow the cone angle in both the vertical and horizontal directions of the test field. Each set of ridges 102, 104 may have even spacing between ridges (even pitch). In other examples, the first set of ridges 102 and the second set of ridges 104 may not be orthogonal.

Light emitted from a first side 100*x* of the light intensity enhancing element 100*b* through to a second side 100*z* is channeled through the light intensity enhancing element

100*b* between the first set of ridges 102, the ridges narrowing a path of light emitted to within a cone angle Y in a direction along planes approximately perpendicular to the first side 100*x*, the planes approximately parallel along a length of the first set of ridges 102. Light emitted is also narrowed to within a cone angle Y' along planes approximately perpendicular to the first side 100*x* and approximately parallel with the length of the second set of ridges 104, also with spacing commensurate with the pitch of the second set of ridges 104. The resulting light waves emitted are thus perpendicular to the first side 100*x* and concentrated at planar intervals defined by the first and second set of ridges 102, 104.

Further, in any example where the light intensity enhancing element 100*b* may be a film or membrane, or a panel 32, a color or hue of the light intensity enhancing element 100*b* may be varied such that light output of the lighting system 10 has a different color or hue than that of the light source 20. In some cases the color may have a red tint, an amber tint, a silver tint, or a white tint. In another case, the color may be clear (no tint). Examples of modifications to a light emitting panel to achieve a desired look in an unlit state are disclosed in U.S. patent application Ser. No. 15/217,703 may be applied to the light enhancing element 100*a*. A number of light intensity enhancing elements 100 may also be combined to produce various combinations of material and color. Directional luminance may also change when the lighting system 10 is in an operating state.

Figure 11B:
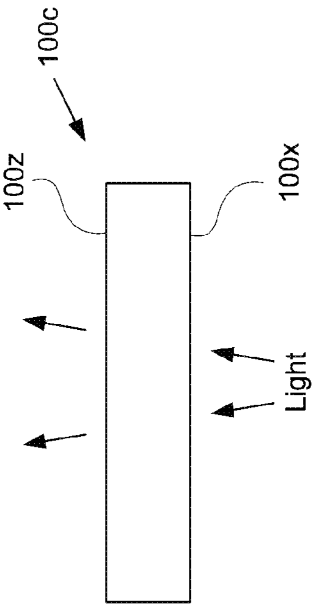
FIG. 11A-11C represent various views of a light intensity enhancing element, according to one example.
Figure 11A:
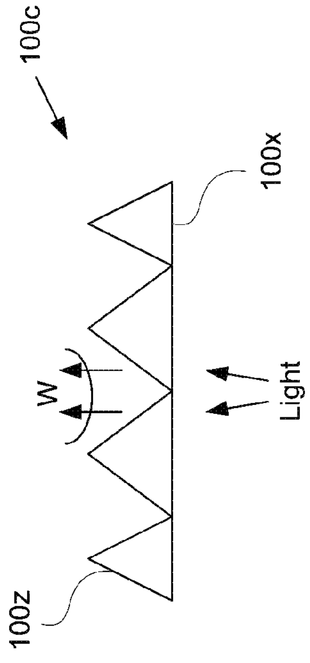
Figure 11C:
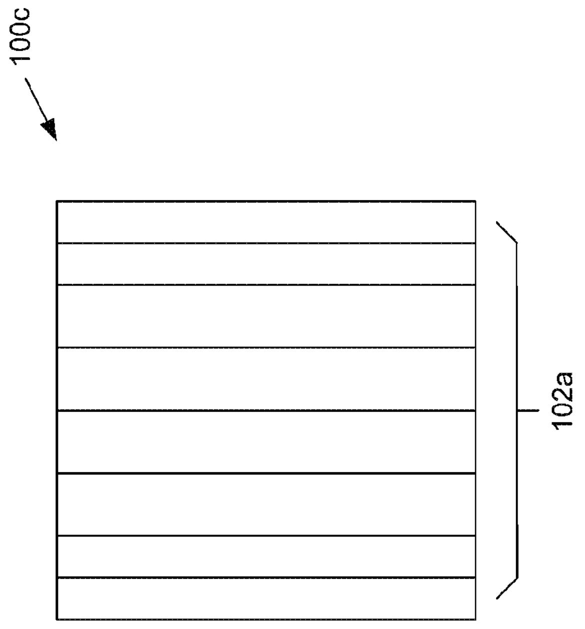

FIG. 11A is a front view of the element 100*c*, FIG. 11B is a side view, and FIG. 11C is a plan view, according to one example. The light intensity enhancing element 100*c* includes a first set of ridges 102*a* oriented in one direction and substantially parallel, with ridges 102*a* that may not be evenly spaced (having uneven pitch). As noted above, this can provide spatial variation of the light output.

Light emitted from a first side 100*x* of the light intensity enhancing element 100*c* through to a second side 100*z* is channeled through the light intensity enhancing element 100*c* between the first set of ridges 102*a*, as described by FIG. 9A-9C, to within a cone angle W.

Figure 12B:
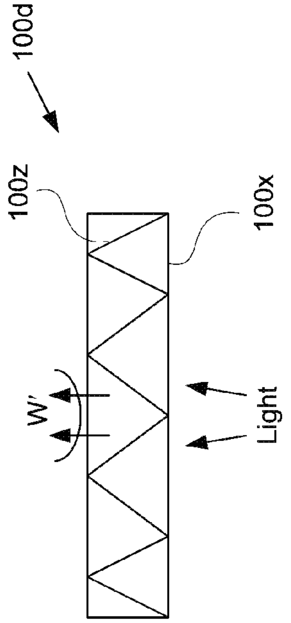
FIG. 12A-12C represent various views of a light intensity enhancing element, according to one example.
Figure 12A:
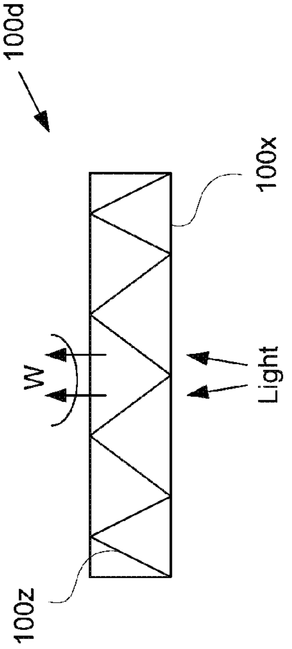
Figure 12C:
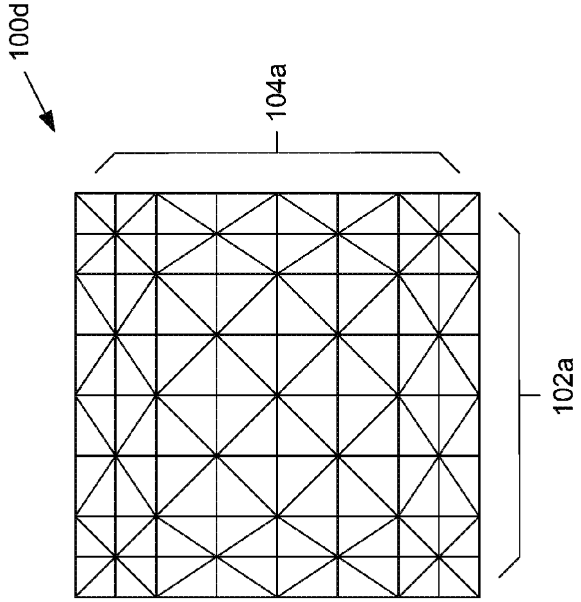

FIG. 12A is a front view of the light intensity enhancing element 100*d*, FIG. 12B is a side view, and FIG. 12C is a plan view, according to one example. The light intensity enhancing element 100*d* includes a first set of ridges 102*a* oriented in one direction, the ridges approximately parallel, and a second set of ridges 104*a* approximately orthogonal to the first set of ridges 102*a*. Each set of ridges 102*a*, 104*a* may be unevenly spaced between ridges (having uneven pitch). In other examples, the first set of ridges 102*a* and the second set of ridges 104*a* may not be orthogonal.

Light emitted from a first side 100*x* of the light intensity enhancing element 100*d* through to a second side 100*z* is channeled through the light intensity enhancing element 100*d* between the first set of ridges 102*a* and the second set of ridges 104*a*, within cone angles W and W', respectively, as in FIG. 10A-10C. The resulting waves of light emitted are thus perpendicular to the first side 100*x* and concentrated at planar intervals defined by the first and second set of ridges 102*a*, 104*a*.

The light intensity enhancing element 100*d* may, for example, comprise a film, membrane, or part optically and/or physically connected to the panel 32 such as with optical or pressure sensitive adhesives, or may be etched into or molded as part of the panel 32 itself.

Any of the light intensity enhancing elements 100*a*-100*d* may be optically combined to narrow the output of light emitted from the light source 20 to increase intensity on specific points or ranges of the H-V graph. In one example, the light intensity enhancing element 100*a* is optically connected to the element 100*c* such that an effective resulting cone angle V is a function of cone angle Y and cone angle W along a first axis of the H-V graph.

In another example, the light intensity enhancing element 100*b* is optically connected to the 100*d* resulting in an effective cone angle V as a function of cone angle Y and cone angle W along a first axis, and an effective cone angle V' as a function of cone angle Y' and cone angle W' along a second axis of the H-V graph.

Figure 13A:
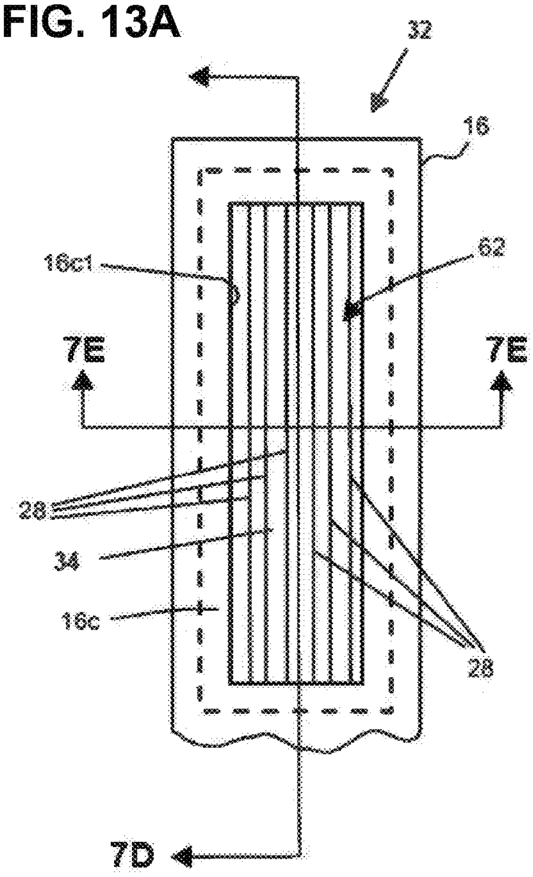
FIGS. 13A-13C show an optical fiber panel having a light enhancing element as part of a structural component in accordance with embodiments of the invention.
Figure 13B:
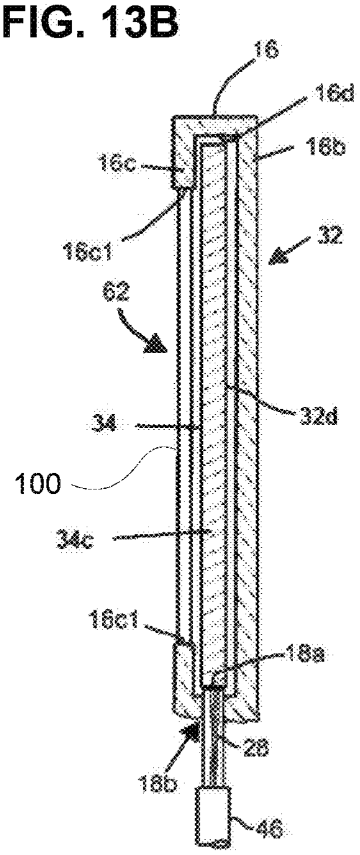
Figure 13C:
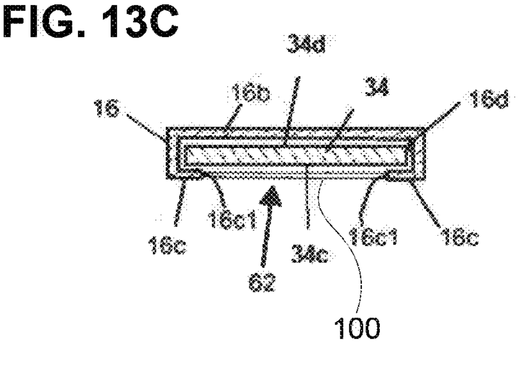

FIGS. 13A, 13B, 13C show fragmentary and sectional views of a lighting device having a structural support including a light enhancing element 100 in accordance with embodiments of the invention. The light enhancing element 100 may be part of a structure configured to shape the lighting panel 32. As seen, the lighting device includes a structural support or frame 16 which receives the fiber layer 34. The support or frame 16 includes a back wall 16*b* and a wall 16*c* that generally opposes the back wall 16*b* as shown in FIG. 13B to provide a bezel for the fiber layer 34. In the embodiment shown, the wall 16*c* frames fiber layer 34. An interior edge 16*c*1 of the wall 16*c* defines a window or an aperture 62 through which light from the first side 34*c* of the layer 34 may be emitted. The fiber layer 34 is inserted into the support or frame 16 such that the light emitting side 34*e* is exposed. As seen a light enhancing element 100 may be provided in the aperture 62.

For ease of illustration, common part numbers in FIGS. 13A-13C are identified with the same part numbers. As noted previously, the support or frame 16 may be curved; however, FIGS. 13A-13C are simplified views of the panel 32 without any curvature. A joining wall 16*d* joins the wall 16*c* to the rear wall 16*b*.

The light enhancing element 100 may be provided as an additional layer of the panel 32. For example, a transmission layer may be provided on the light emitting side 32*e* of the panel as shown in FIGS. 9-12 above. The light enhancing element 100*a* may be printed, etched, or molded into the base layer. Alternatively, the light enhancing element 100 may be provided as part of the fiber optic layer 34. For example, the plurality of optical fibers 28 may be encapsulated in a medium 35 as shown in FIG. 6, and the transmission layer may be printed, etched, or molded into the medium.

Figure 14A:
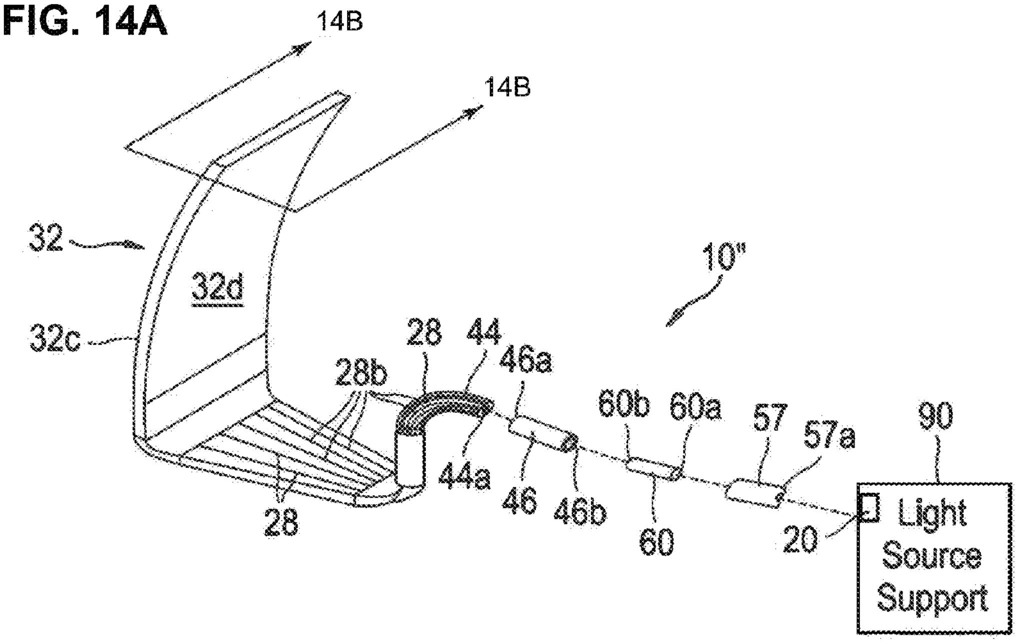
FIG. 14A is an exploded view drawing showing the components of an exterior vehicle lighting device in accordance with an embodiment of the invention.

FIG. 14A is an exploded view showing arrangement of the components of a vehicle lighting device in accordance with an embodiment of the invention. For example, the system 10' may be included in the headlight or taillight of a vehicle V as shown in FIG. 14C. As seen in FIG. 14A, the system 10' includes a panel 32 having a light emitting side 32*e* through which light from the plurality of optical fibers 28 is emitted, and a light reflecting side 32*c* which may be partially or fully coated with a reflective material in order to reflect light through side 32*e* as discussed above.

Figure 14B:
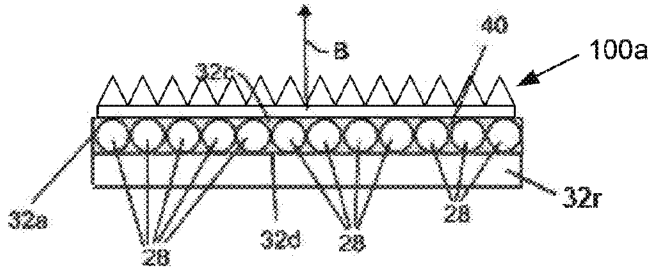
FIG. 14B is a sectional view of the panel of the device in FIG. 8A.
Figure 14C:
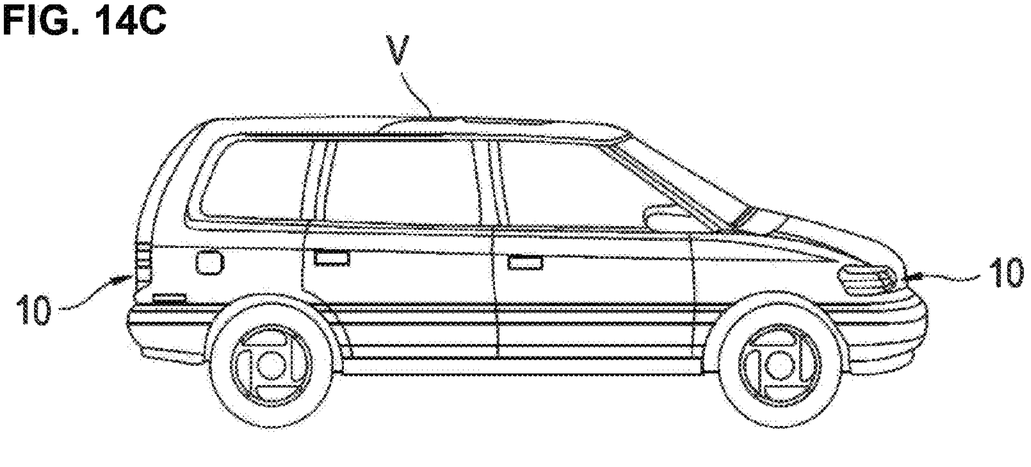
FIG. 14C is a view of a vehicle including a fiber optic light panel device according to embodiments of the invention.

FIG. 14B is a sectional view of the panel of FIG. 14A. As seen, fibers 28 are arranged in a fiber array and embedded in a substrate 40, which could be a polymer, resin or other conventional substrate. Portions 28*b* of the plurality of optical fibers 28 extend out of the substrate 40 and panel 32 and are gathered and combined in a fiber bundle 44 to define a light-receiving end or input end 44*a*. In the embodiment of FIG. 14A, the input end 44*a* becomes operatively positioned in a first end 46*a* of a mechanical coupler 46 having opposing end 46*b*. The coupler 46 may be a ferrule and include a wrap, sleeve, adhesive, tape, resin or the like to facilitate holding the fibers 28 in the bundled position illustrated in FIG. 5B.

Optical coupler 60 has a first and second ends 60*a* and 60*b*. The first end 60*a* is mechanically coupled to, and received in, a hollow plug 57. Second end 60*b* is received in the second end 46*b* of coupler 46 to optically align coupler/60 to the fiber bundle 44. During assembly, an end 57*a* of the plug 57 is coupled to the light source support of a vehicle light housing to provide optical coupling with the light source 20. In the illustration, the optical coupler 60 is an integral one piece construction made of silicone or plastic. The optical coupler 60 may be an optical mixer configured to improve a homogeneous property of light coupled to the fiber bundle as disclosed in U.S. patent application Ser. No. 15/210,189, filed by the present Applicants on Jul. 14, 2016. The entire contents of this application is incorporated herein by reference.

It should be understood that the illustrations being described show a single light source 20 associated with a single panel 32, but a single light source 20 may be used for multiple panels 32. For example, ends of the optic fibers 28 of different panels 32 may be bundled and coupled to a single coupler 46 associated with the single light source 20. In such configuration, the light source 20 is optically coupled to the optical fibers 28 from multiple panels 32, and a single light source 20 can be used with multiple panels 32. In such a case, it may be necessary to provide a coupler (not shown) that is adapted to receive the multiple bundles of fibers 28. Alternatively, the optical mixer 60 may be shaped to provide three separate input surfaces for coupling three light sources to a fiber bundle.

Advantageously the embodiments described herein are particularly suited for exterior lighting and in environments where it is necessary that the lighting match or conform to the contour or styling of the vehicle V.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

The invention claimed is:

1. A lighting module for a vehicle, comprising:

a light source;

a light emitting panel optically coupled to the light source, said light emitting panel comprising an array of optical fibers; and a light enhancing element optically coupled to the light emitting panel such that the panel outputs light with a first cone angle to the light enhancing element, wherein the light enhancing element is configured to narrow the first cone angle to a second cone angle smaller than the first cone angle.

2. The lighting module of claim 1, wherein the light enhancing element comprises a first film disposed over a light output side of the light emitting panel.

3. The lighting module of claim 2, wherein the light enhancing element comprises a second film disposed over the first film.

4. The lighting module of claim 1, wherein the light enhancing element is molded into a surface of a light output side of the light emitting panel.

5. The lighting module of claim 1, wherein the light enhancing element comprises at least one of a red, an amber, a silver, and a white tint color.

6. The lighting module of claim 4, wherein the light intensity enhancing element is formed from polycarbonate as integral component with the panel.

7. The lighting module of claim 4, wherein the light enhancing element comprises a plurality of ridges.

8. The lighting module of claim 7, wherein the plurality of ridges are aligned in at least one direction.

9. The lighting module of claim 7, wherein the plurality of ridges have a constant pitch.

10. The lighting module of claim 7, wherein the plurality of ridges have a variable pitch.

11. The lighting module of claim 1, wherein the light enhancing element is etched into a surface of a light output side of the light emitting panel.

12. The lighting module of claim 1, wherein the light source is an OLED.

13. A method of manufacturing a lighting device for a vehicle, comprising:

providing a light source for generating light;

providing a fiber optic light panel comprising a plurality of optical fibers arranged in a predetermined form;

optically coupling the light source to the fiber optic light panel such that diffuse light is emitted from the fiber optic light panel having a first cone angle; and providing a first light intensity enhancing element optically coupled to the fiber optic panel to narrow the first light cone angle of light emitted by the fiber optic panel.

14. The method of claim 13, further comprising providing a second light intensity enhancing element optically connected to a surface of the first light intensity enhancing element to narrow a second light cone angle of light emitted by the first light intensity enhancing element.

15. The method of claim 14, further comprising at least one of molding and etching at least one of the first and the second light intensity enhancing elements.

16. A tail light assembly for a vehicle comprising:

a housing; and a lighting module contained in the housing, the lighting module comprising:

a light source;

a light emitting panel optically coupled to the light source, said light emitting panel comprising an array of optical fibers; and a light enhancing element optically coupled to the light emitting panel such that the panel outputs light with a first cone angle to the light enhancing element, wherein the light enhancing element is configured to narrow the first cone angle to a second cone angle smaller than the first cone angle.

17. The tail light assembly of claim 16, wherein the light enhancing element comprises a first film disposed over a light output side of the light emitting panel.

18. The tail light assembly of claim 17, wherein the light enhancing element comprises a second film disposed over the first film.

19. The tail light assembly of claim 16, wherein the light enhancing element is molded into a surface of a light output side of the light emitting panel.

20. The tail light assembly of claim 16, wherein the light enhancing element is etched into a surface of a light output side of the light emitting panel.

* * * * *